(12) United States Patent
Marsh et al.

(10) Patent No.: US 10,024,082 B2
(45) Date of Patent: Jul. 17, 2018

(54) DUAL-LOCKING LOTO LOCKING PINS

(71) Applicant: The Boeing Company, Chicago, IL (US)

(72) Inventors: Bob Marsh, Lake Stevens, WA (US); Joshua Kye Terry, Lynnwood, WA (US); Dain Willey, Bothell, WA (US)

(73) Assignee: The Boeing Company, Chicago, IL (US)

( * ) Notice: Subject to any disclaimer, the term of this patent is extended or adjusted under 35 U.S.C. 154(b) by 105 days.

(21) Appl. No.: 15/046,350

(22) Filed: Feb. 17, 2016

(65) Prior Publication Data

US 2017/0236349 A1 Aug. 17, 2017

(51) Int. Cl.

| | |
|---|---|
| *E05B 47/00* | (2006.01) |
| *E05B 67/36* | (2006.01) |
| *E05B 17/10* | (2006.01) |
| *E05B 63/12* | (2006.01) |
| *E05B 37/00* | (2006.01) |
| *B64F 5/00* | (2017.01) |
| *G05B 15/02* | (2006.01) |
| *G08B 5/36* | (2006.01) |
| *E05B 65/00* | (2006.01) |

(Continued)

(52) U.S. Cl.
CPC .......... *E05B 67/365* (2013.01); *B64F 5/0081* (2013.01); *E05B 17/10* (2013.01); *E05B 17/2011* (2013.01); *E05B 37/00* (2013.01); *E05B 47/0001* (2013.01); *E05B 63/121* (2013.01); *E05B 65/0089* (2013.01); *G05B 15/02* (2013.01); *G08B 5/36* (2013.01); *G08B 13/2434* (2013.01); *E05B 2047/0015* (2013.01); *E05B 2047/0048* (2013.01)

(58) Field of Classification Search
CPC ...... E05B 17/20; E05B 17/2011; E05B 17/22; E05B 17/226; E05B 47/00; E05B 47/0001; E05B 47/0012; E05B 2047/0013; E05B 2047/0014; E05B 2047/0015; E05B 2047/0017; E05B 63/12; E05B 63/121; E05B 65/0089; E05B 67/36; E05B 67/365
See application file for complete search history.

(56) References Cited

U.S. PATENT DOCUMENTS

| | | | |
|---|---|---|---|
| 3,924,506 A | 12/1975 | Uozumi | |
| 4,543,807 A * | 10/1985 | Swisher | E05B 67/365 70/34 |
| 4,568,998 A | 2/1986 | Kristy | |

(Continued)

*Primary Examiner* — Christopher J Boswell
(74) *Attorney, Agent, or Firm* — Haynes and Boone, LLP

(57) ABSTRACT

A locking pin includes a body having a plurality of apertures defined through a sidewall. A closure is disposed at an end of the body. A plurality of latch bolts is disposed in the body and adjacent to the closure. Each latch bolt is moveable through a corresponding one of the apertures and between a locked position, disposed at least partially outside of the body, and an unlocked position, disposed at least substantially within the body. A keeper is coupled to each of the latch bolts and configured to retain the latch bolt in the latched position and to bias the latch bolt for movement from the locked position to the unlocked position. A mechanism selectably engages each latch bolt to move the latch bolt to the locked position, and selectably disengages from the latch bolt to allow the keeper to move the latch bolt to the unlocked position.

20 Claims, 3 Drawing Sheets

(51) Int. Cl.
*E05B 17/20* (2006.01)
*G08B 13/24* (2006.01)

(56) References Cited

U.S. PATENT DOCUMENTS

| | | | | |
|---|---|---|---|---|
| 4,637,234 A * | 1/1987 | Mielonen | ............ | E05L 367/365 70/34 |
| 4,648,738 A | 3/1987 | Thielen | | |
| 4,744,021 A | 5/1988 | Kristy | | |
| 4,840,528 A | 6/1989 | Doom | | |
| 5,611,223 A * | 3/1997 | Spitzer | ................ | E05B 73/0082 248/552 |
| 5,836,187 A | 11/1998 | Janssen et al. | | |
| 6,244,084 B1 | 6/2001 | Warmack | | |
| 6,386,789 B1 | 5/2002 | Chausse et al. | | |
| 6,684,670 B1 * | 2/2004 | Agbay | ................ | E05B 67/365 70/14 |
| 6,948,685 B2 * | 9/2005 | Hawthorne | ....... | E05L 347/0002 244/129.1 |
| 7,215,250 B2 | 5/2007 | Hansen et al. | | |
| 7,298,274 B2 | 11/2007 | Chen et al. | | |
| 7,334,443 B2 | 2/2008 | Meekma et al. | | |
| 7,775,071 B2 * | 8/2010 | Agbay | ................ | E05L 321/066 70/164 |
| 7,800,504 B2 | 9/2010 | Teeter | | |
| 7,905,676 B2 | 3/2011 | Halder | | |
| 8,474,289 B2 * | 7/2013 | Solomon | .............. | E05L 363/121 70/34 |
| 8,558,700 B2 | 10/2013 | Chen | | |
| 8,863,563 B2 * | 10/2014 | Gentile | ............... | E05B 47/0038 24/303 |
| 8,875,550 B1 | 11/2014 | Spunt et al. | | |
| 9,455,076 B2 * | 9/2016 | Cascolan | ................ | H01F 7/124 |
| 9,528,297 B2 * | 12/2016 | Gentile | ............... | E05B 47/0038 |
| 2006/0099838 A1 | 5/2006 | Meyers | | |
| 2007/0243042 A1 | 10/2007 | Baus | | |
| 2010/0109348 A1 | 5/2010 | Boutaghou | | |
| 2012/0210757 A1 * | 8/2012 | Gentile | ................ | E05B 67/365 70/276 |
| 2013/0067969 A1 | 3/2013 | Webb et al. | | |
| 2013/0214903 A1 | 8/2013 | Kalous et al. | | |
| 2013/0336719 A1 | 12/2013 | Baus | | |
| 2014/0113563 A1 | 4/2014 | Almomani et al. | | |
| 2014/0116057 A1 | 5/2014 | Peters | | |
| 2014/0260455 A1 * | 9/2014 | Dewalch | ........... | E05L 347/0009 70/283.1 |
| 2014/0353983 A1 | 12/2014 | Vetter et al. | | |

* cited by examiner

DUAL-LOCKING LOTO LOCKING PINS

BACKGROUND

This disclosure relates to locking devices in general, and more particularly, to dual-locking radio-frequency (RF) enabled Lockout-Tagout (LOTO) locking pins useful in equipment maintenance and servicing applications.

A "LockOut-TagOut" or "LOTO" device is a tool used in industrial and research settings to ensure that machines or mechanisms are properly shut off and/or immobilized and cannot start up or move prior to the completion of maintenance or servicing activities. The term "tagout" refers to the attachment of a tag or other written medium to the locking device that can indicate, for example, when, why, by what authority the locking device was placed in effect, and/or is authorized to remove.

Some locking devices, such as locking pins, are locked in place by a mechanism, e.g., a cotter pin, such that the locking pins can be easily removed or deactivated by anyone having access to the device, whether authorized or not. In some scenarios, a security risk may be present, so the locking pin may be provided with a more secure locking mechanism, e.g., a keyed lock, (such as a padlock), to prevent tampering or unintentional removal of the pin.

One drawback of the latter type of locking pin is the need for possession of the appropriate, typically unique, mechanical key to unlock the device for removal, together with the associated problems of maintaining appropriate custody of the key and the risk of loss of the key. Another drawback is that the locking pins may be difficult to access, and, in dark environments and/or in which a large number of such devices are installed, such as in unlit cargo bays or aircraft wing boxes, both the mechanical key and the particular locking pin to which the key is associated can be difficult to identify, locate and/or operate.

SUMMARY

In accordance with the present disclosure, example embodiments of dual-locking, RF-enabled LOTO locking pins are provided, together with methods for making and using the locking pins.

In one example embodiment, a locking pin includes a body having an inner surface, an outer surface, opposite first and second ends, a sidewall extending between the opposite first and second ends, and a plurality of apertures, at least one of the apertures being defined through the sidewall. A first closure is disposed at the first end of the body. A plurality of latch bolts is disposed in the body and adjacent to the first closure. Each latch bolt is moveable through a corresponding one of the apertures and between a locked position and an unlocked position. Each latch bolt is disposed at least partially outside of the outer surface of the body in the locked position, and each latch bolt being disposed at least substantially within the inner surface of the body in the unlocked position. A keeper is disposed adjacent to the first end of the body. The keeper is coupled to each of the latch bolts and configured to retain the latch bolt in the latched position and to bias the latch bolt for movement from the locked position to the unlocked position. A mechanism is configured to selectably engage each latch bolt to move the latch bolt to the locked position, and to disengage from the latch bolt to allow the keeper to move the latch bolt to the unlocked position.

In another example embodiment, a method for controlling relative movement between two adjacent structures using a locking pin, the locking pin including a body, a first closure, a plurality of latch bolts, a keeper, and a mechanism, wherein the body has an inner surface, an outer surface, opposite first and second ends, a sidewall extending between the opposite first and second ends, a flange disposed on the outer surface between the first and second ends, and a plurality of apertures, where at least one aperture is defined through the sidewall, the first closure is disposed at the first end of the body, the plurality of latch bolts is disposed in the body and adjacent to the first closure, the keeper is disposed adjacent to the first end of the body, and the mechanism configured to selectably engage each latch bolt, comprises aligning a first opening extending through a first structure of the two structures coaxially with a second opening extending through a second structure of the two structures such that a side surface of the first structure is oriented in a direction generally opposite to that of a side surface of the second structure. Each latch bolt is moved into an unlocked position using the mechanism, and each latch bolt is disposed at least substantially within the inner surface of the body in the unlocked position. The first end of the body is inserted through the first and second openings such that the latch bolts are disposed outside of the side surface of the first structure and the flange is disposed outside of the side surface of the second structure, and the latch bolts are moved into locked positions using the mechanism such that the structures are clamped between the latch bolts and the flange, wherein each latch bolt is disposed at least partially outside of the outer surface of the body in the locked position.

In yet another example embodiment, a method for making a locking pin, the locking pin including a body having an inner surface, an outer surface, opposite first and second ends, a sidewall extending between the opposite first and second ends, and a plurality of apertures, at least one aperture of the plurality of apertures is defined through the sidewall, comprises placing a first closure at the first end of the body, disposing a plurality of latch bolts in the body and adjacent to the first closure, each latch bolt being moveable through a corresponding one of the apertures and between a locked position, disposed at least partially outside of the outer surface of the body, and an unlocked position, disposed at least substantially within the inner surface of the body, and inserting a keeper into the body and adjacent to the first end. The keeper is coupled to each of the latch bolts and configured to retain each latch bolt in the unlocked position and to bias each latch bolt for movement from the locked position to the unlocked position. A mechanism is installed into the body and adjacent to the latch bolts. The mechanism is configured to selectably engage each latch bolt and move the latch bolt to the locked position, and to disengage from the latch bolt and allow the keeper to move the latch bolt to the unlocked position.

The scope of the invention is defined by the appended claims, which are incorporated here by reference. A better understanding of the dual-locking, RF-enabled locking pins of the present disclosure, as well as an appreciation of the above and additional advantages thereof, will be afforded to those of some skill in the art by a consideration of the following detailed description of one or more example embodiments thereof. In this description, reference is made to the various views of the appended sheets of drawings, which are briefly described below, and within which like reference numerals are used to identify like elements illustrated therein.

DETAILED DESCRIPTION

In accordance with the present disclosure, example embodiments of keyless, dual-locking, RF-enabled LOTO locking pins are provided, together with methods for making and using the locking pins. The embodiments described herein can provide for safe, reliable, inexpensive, and easy-to-use LOTO devices and methods during, e.g., maintenance and/or repair of aircraft.

Figure 1A:
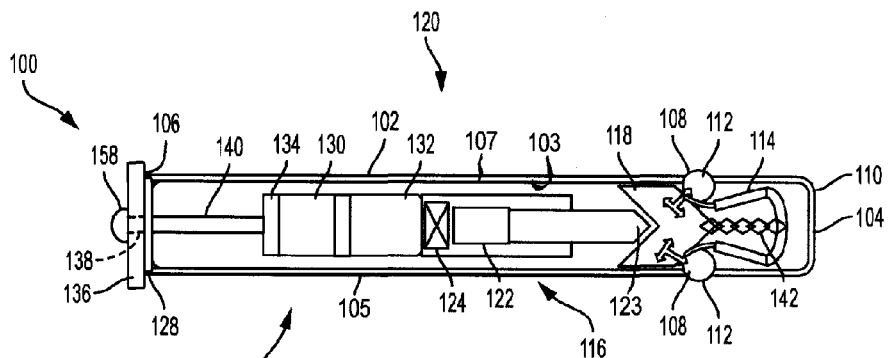
FIG. 1A is a cross-sectional side view of an example embodiment of a dual-locking, RF-enabled, locking pin in accordance with the present disclosure, showing the locking pin disposed in a locked state.
Figure 1B:
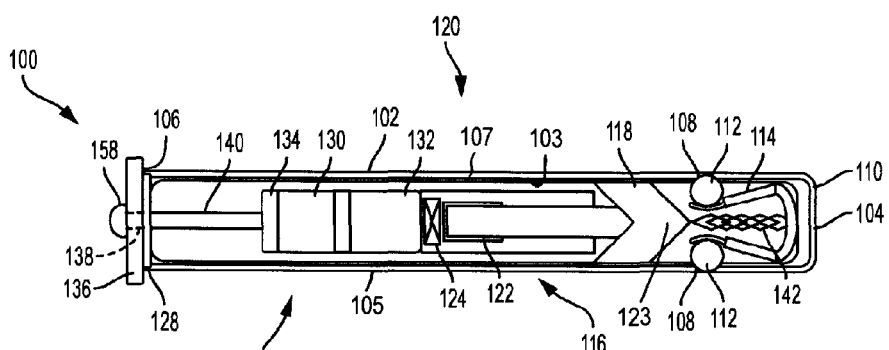
FIG. 1B is a cross-sectional side view of the example locking pin, showing the locking pin disposed in an RF-actuated unlocked state.

FIG. 1A is a cross-sectional side view of an example embodiment of a dual-locking, RF-enabled locking pin 100 in accordance with the present disclosure, showing the locking pin 100 disposed in a locked state. FIG. 1B is a cross-sectional side view of the example locking pin 100, showing the locking pin 100 disposed in an RF-actuated unlocked state, and FIG. 1C is a cross-sectional side view of the example locking pin 100, showing the locking pin 100 disposed in a manually-actuated unlocked state.

As illustrated in these Figures, the novel locking pin 100 includes a body 102, (e.g., a barrel or tube), having an inner surface 103, an outer surface 105, and opposite first and second ends 104 and 106. The locking pin 100 further includes a sidewall 107 extending between the first and second ends 104 and 106 and a plurality of apertures 108. At least one aperture of the apertures 108 is defined through the sidewall 107. A first closure 110 is disposed at the first end 104 of the body 102, and a plurality of latch bolts 112 is disposed in the body 102 and adjacent to the first closure 110. Each of the latch bolts 112 is moveable through a corresponding one of the apertures 108 and between a locked position and an unlocked position. In the locked position, the latch bolts 112 are disposed at least partially outside of the outer surface 105 of the body 102, as illustrated in FIG. 1A. In the unlocked position, the latch bolts 112 are disposed at least substantially within the inner surface 103 of the body 102, as illustrated in FIGS. 1B and 1C. In the particular example embodiment illustrated, each of the latch bolts 112 includes a rigid sphere, e.g., a steel ball bearing. However, in other possible embodiments, the latch bolts 112 could include radially moveable pins, or alternatively, levers disposed in axial grooves and pivotably coupled to the body 102 to swing inward and outward therefrom.

A latch-bolt keeper 114 is disposed adjacent to the first end 104 of the body 102. The keeper 114 is made of a resilient material, e.g., spring steel or beryllium. The keeper 114 is coupled to each of the latch bolts 112 and configured both to retain the latch bolts 112 and to bias the latch bolts 112 for movement from the locked position to the unlocked position. A mechanism 116 is configured to selectably engage each latch bolt 112 to move the latch bolt 112 to the locked position, and to disengage from the latch bolt 112 to allow the keeper 114 to move the latch bolt 112 to the unlocked position.

Figure 1C:
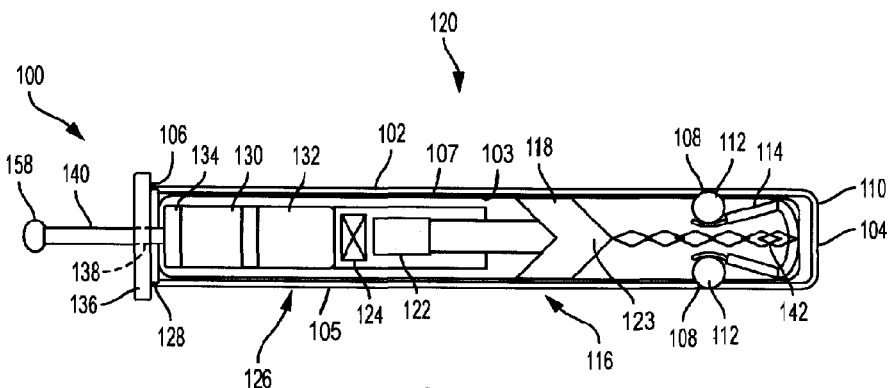
FIG. 1C is a cross-sectional side view of the example locking pin, showing the locking pin disposed in a manually-actuated unlocked state.

As illustrated in FIGS. 1A-1C, the mechanism 116 can include an object 118, such as a wedge having a plurality of inclined-plane surfaces defined thereon, that is disposed within the body 102 for movement between a locking position, as illustrated in FIG. 1A, and an unlocking position, as illustrated in FIG. 1B. In the locking position, the object 118 is disposed in engagement with each latch bolt 112 so as to move the latch bolt 112 into the locked position, as discussed above. In the unlocking position, the object 118 is disposed out of engagement with each latch bolt 112, to allow the keeper 114 to move the latch bolt 112 to the unlocked position, as above. The mechanism 116 further includes a driving mechanism 120 disposed within the body 102 and coupled to the object 118. The driving mechanism 116 is configured to selectably move the object 118 between the foregoing locking and unlocking positions.

In the particular example embodiment illustrated, the driving mechanism 120 includes an actuator 122 disposed within the body 102. The actuator 122 has an output end 123 coupled to the object 118. A motor 124 is coupled to the actuator 122 and configured to move the output end of the actuator 118 within the body 102 to a selected position within the body 102 in response to the application of a corresponding electrical signal to the motor 124. The actuator 122 can include, for example, a miniature rotary-to-linear actuator or a ball-screw actuator, and the motor 124 can be a miniature direct drive electric motor with a "Halbach Array" of permanent magnets.

The driving mechanism 120 can be provided with an appropriate controller 126 that is electroconductively coupled to the motor 124 and configured to apply a signal to the motor 124 corresponding to a command supplied to the controller 124 by a user, or that is otherwise suitable for remote operation of the lock pin 100. In the particular example embodiment of FIGS. 1A-1C, the controller 126 includes a radio-frequency (RF) antenna 128 disposed at the first end 106 of the body 102, an RF transceiver 130 electroconductively coupled to the antenna 128, a microcontroller 132 electroconductively coupled to the RF transceiver 130 and the motor 124, and a power source 134 electroconductively coupled to the motor 124, the RF transceiver 130, and the microcontroller 132.

The microcontroller 132 can include, for example, a miniature, "open source," programmable microcontroller, and the RF antenna 128 and transceiver 132 can be configured to operate in accordance with one or more domestic or international radio-frequency identification (RFID) standards. The power source 134 can include, for example, a rechargeable battery, such as a lithium-ion battery.

The controller 126 can be programmed or configured, for example, to receive a "lock" command or an "unlock" command transmitted wirelessly from a remote RF transceiver (not illustrated), translate the command into a corresponding signal, and apply the corresponding signal to the motor 124 so as to move the object 118 to the locking or the unlocking position, respectively, and thereby lock or unlock the locking pin 100 remotely. Additionally, the controller 126 can be configured to receive an identification (ID) command transmitted wirelessly from a remote RF transceiver, modulate the ID command with a second signal corresponding to a unique ID code associated with the pin 100 so as to produce an ID signal, and to transmit the ID signal wirelessly back to the remote RF transceiver so as to identify the locking pin 100 to a user. In addition to the foregoing actuation and identification functions, the controller 126 can also be configured to facilitate location of the locking pin 100 in a dimly lit or unlit environment, and/or to assess the charge on the power source 134, as described in more detail below.

The foregoing remote operation and identification functions may not be available if the power source 134 is unable to supply the electrical power necessary to drive the motor 134 and/or the RF transceiver 132. Accordingly, the example locking pin 100 is also provided with a keyless mechanical locking function that enables the locking pin 100 to be unlocked manually if the power source 134 is insufficient to activate the driving mechanism 120, or if access to the internal components of the pin 100 is desirable, for example, to replace or repair one or more of the internal components.

Thus, as illustrated in FIGS. 1A-1C, the locking pin 100 further includes a second closure 136, such as a threaded cap, disposed at the second end 106 of the body 102. The second closure 136 has an aperture 138 extending through the second closure 136. The locking pin 100 also includes a release rod 140 having an outer end extending from the power source 134 and controller 126 and through the aperture 138. A biasing mechanism 142, such as a spring, is disposed between the object 118 and the first closure 110. The biasing mechanism 142 is configured to move an assembly comprising the object 118, the controller 126, the power source 134, and the release rod 140 toward the second end 106 of the body 102, as illustrated in FIG. 1C.

Figure 2A:
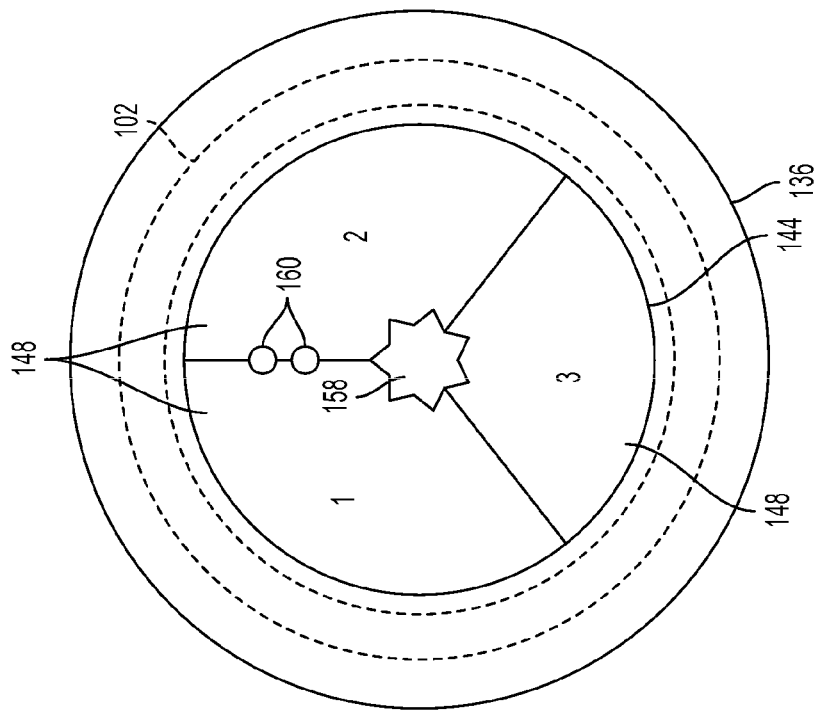
FIGS. 2A and 2B are plan views of one end of the locking pin, showing a manually actuated pushbutton combination lock thereof.
Figure 2B:
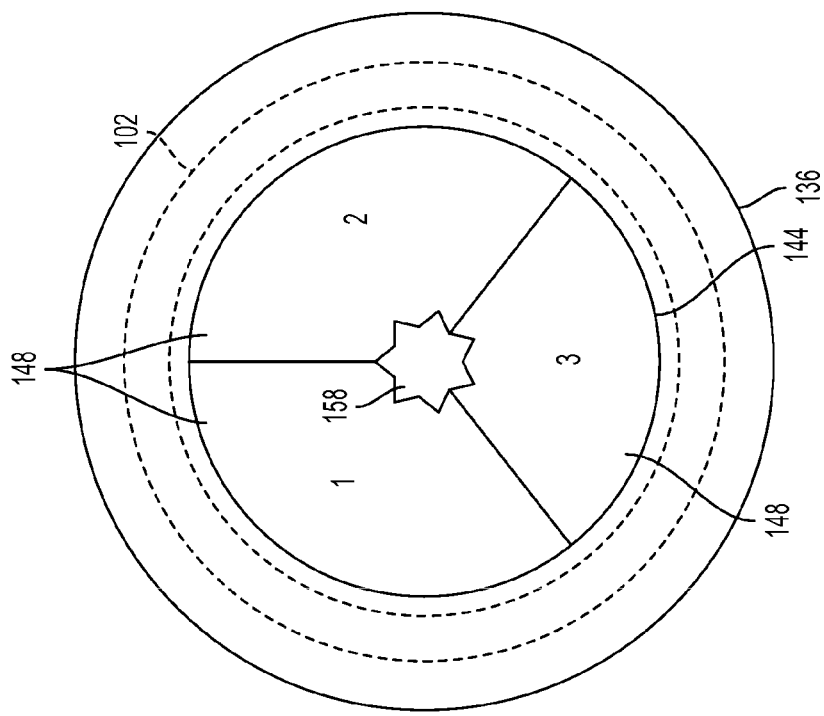

FIGS. 2A and 2B are plan views of the second end 106 of the locking pin 100, showing a manually actuated pushbutton combination lock 144 of the pin 100. As illustrated in FIGS. 2A and 2B, the combination lock 144 is disposed within or adjacent to the second closure 136 and has a locked state and an unlocked state. When disposed in the locked state, the lock 144 is configured to engage the release rod 140 and hold the above assembly such that the object 118 is disposed in the locking position, as illustrated in FIG. 1A. When disposed in the unlocked state, the lock 144 is configured to disengage from the release rod 140 and allow the biasing mechanism 142 to move the entire assembly rearward such that the object 118 is disposed in the unlocking position. In the unlocking position, the second closure 136, together with the above assembly, is removable from the body 102 for servicing.

Thus, for example, if the second closure 136 includes a threaded cap, the engaging features of the lock 144 can be configured to prevent the thread of the cap from turning within a complementary thread in the body 102 when the lock 144 is disposed in the locked state. In this example, the lock 144 is configured to allow the thread of the cap to turn within the complementary thread of the body 102 when the lock 144 is disposed in the unlocked state so that the cap, together with the release rod 140, the controller 126, the power source 134, and the object 118, can be removed from the second end 106 of the body 102 for servicing and/or replacement.

As illustrated in FIGS. 2A and 2B, the combination lock 144 can include a plurality of buttons 148 which, when pressed in a predetermined sequence, causes the lock 144 to transition from the locked state to the unlocked state. The illustrated example includes three buttons 148, but the lock 144 can include any suitable number of buttons 148. The procedure for unlocking the combination lock 144 having three buttons 148 can be as illustrated sequentially in FIGS. 3A-3C. Thus, for example, the combination of the lock 144 could be "3-1-2," such that, by pressing the numbered buttons 148 in that sequence, and only in that sequence, causes the lock 144 to transition from the locked state to the unlocked state, as described above.

Figure 3A:
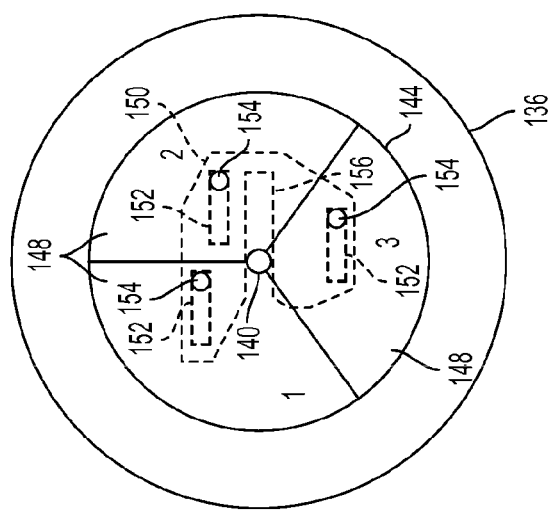
FIGS. 3A-3C are plan views of the end of the locking pin similar to FIGS. 2A and 2B, showing operation of the combination lock of the pin.
Figure 3B:
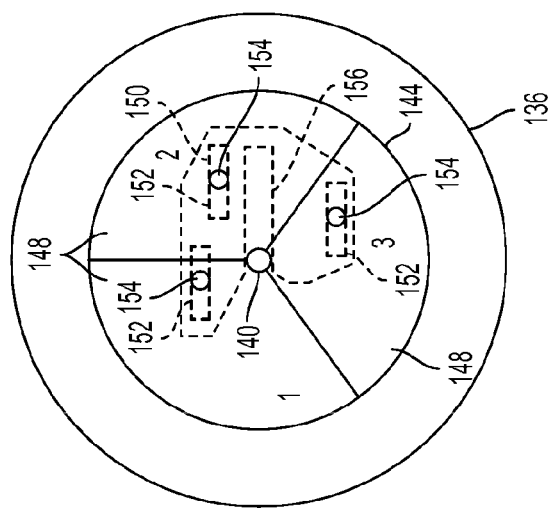
Figure 3C:
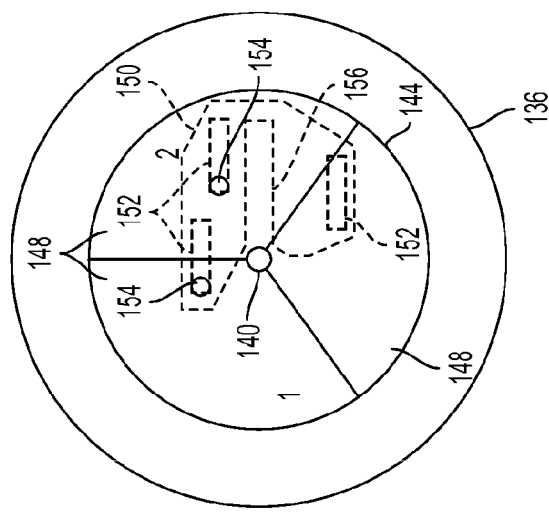

As illustrated in FIGS. 3A-3C, a spring loaded internal locking plate 150 (indicated by the dashed lines) is disposed within the lock 144 and includes a plurality of slots 152 respectively positioned within the locking plate 150 to interact with a corresponding plurality of release pins 154 respectively disposed on corresponding ones of the pushbuttons 148. The internal locking plate 150 also includes a slot 156 configured to engage the release rod 140 and prevent the release rod 140 from moving axially relative to the closure 136 when the lock 144 is disposed in the locked state.

As illustrated in FIG. 3A, an example unlocking procedure begins with depressing the button 148 labeled "3" first. Doing so causes the spring loaded internal locking plate 150 to shift slightly to the right, to the position illustrated in FIG. 3B. Next, the button 148 labeled "1" is depressed, allowing the internal locking plate 150 to shift further to the right, as illustrated in FIG. 3C. Lastly, the button 148 labeled "2" is pushed, which causes the locking plate 150 to shift further to the right, such that the slot 156 in the plate 150 clears the release rod 140, allowing the release rod 140, together with the assembly of the power source 134, the controller 126, and the object 118, to move rearwardly and unlock the locking pin 100, as discussed above in connection with FIG. 1C.

For locating the locking pin 100 and for other useful purposes, the locking pin 100 can be provided with at least one indicator 158 configured to produce an alarm in response to an application of a signal to the indicator 158. The indicator 158 can include, for example, a light emitting diode (LED) disposed at the outer end of the release rod 140, as illustrated in FIGS. 1A-1C, 2A and 2B. In such an embodiment, the indicator 158 is capable of producing light of a plurality of different colors. In one possible embodiment, the controller 126 can be configured to control the indicator 158 to produce light of a first color, e.g., white, when the power source 134 is at a first charge level. The indicator 158 can produce a second color, e.g., green, when the power source is at a second charge level. Further, the indicator 158 can produce a third color, e.g., red, when the RF transceiver 134 receives, for example, a "locate" command transmitted wirelessly from a remote RF transceiver.

The indicator 158 need not necessarily be limited to a light source such as an LED, but instead, or in addition to such a light source, could include a sound source, such as a buzzer or speaker. Additionally, as illustrated in FIG. 2B, in some embodiments, the second closure 136 can be provided with a pair of electrical contacts 160 that can be used, for example, to recharge the power source 134, or to otherwise actuate the electronic components of the locking pin 100.

Indeed, as those of some skill will by now appreciate, and depending on the specific application at hand, many modifications, substitutions and variations can be made in and to the materials, apparatus, configurations and methods of manufacture and use of the dual-locking, RF-enabled, locking pins of present disclosure without departing from its spirit and scope. In light of this, the scope of the disclosed embodiments should not be seen as limited to those of the particular embodiments illustrated and described herein, as the particular embodiments described herein are merely by way of some examples thereof, but rather, should be fully commensurate with that of the claims appended hereafter and the functional equivalents of the claims.

What is claimed is:

1. A locking pin, comprising:
   a body having an inner surface, an outer surface, opposite first and second ends, a sidewall extending between the opposite first and second ends, and a plurality of apertures, wherein at least one of the apertures is defined through the sidewall;
   a first closure disposed at the first end of the body;
   a plurality of latch bolts disposed in the body and adjacent to the first closure, each latch bolt being moveable through a corresponding one of the apertures and between a locked position and an unlocked position, each latch bolt being disposed at least partially outside of the outer surface of the body in the locked position, and each latch bolt being disposed at least substantially within the inner surface of the body in the unlocked position;
   a keeper disposed adjacent to the first end of the body, the keeper being coupled to each of the latch bolts and configured to solely retain the latch bolt in the unlocked position and to bias the latch bolt for movement from the locked position to the unlocked position; and
   a mechanism configured to selectably engage each latch bolt to move the latch bolt to the locked position, and to disengage from the latch bolt to allow the keeper to move the latch bolt to the unlocked position.

2. The locking pin of claim 1, wherein at least one of the latch bolts comprises a rigid sphere, and wherein the keeper comprises a resilient spring steel or beryllium material, and the locking pin further comprises a biasing mechanism disposed between the mechanism and the first end of the body and configured to move the mechanism toward the second end of the body.

3. The locking pin of claim 1, wherein the mechanism comprises:
   an object disposed within the body for movement between a locking position and an unlocking position, wherein, in the locking position, the object is disposed in engagement with each latch bolt to move the latch bolt into the locked position, and in the unlocking position the object is disposed out of engagement with each latch bolt to allow the keeper to move the latch bolt to the unlocked position; and
   a driving mechanism disposed within the body and coupled to the object, the driving mechanism being configured to selectably move the object between the locking and the unlocking positions.

4. The locking pin of claim 3, wherein the driving mechanism comprises:
   an actuator disposed within the body and having an output end coupled to the object; and
   a motor coupled to the actuator and configured to move the output end of the actuator within the body to a selected position in the body in response to application of a corresponding signal to the motor.

5. The locking pin of claim 4 wherein the actuator comprises a rotary-to-linear actuator or a ball-screw actuator.

6. The locking pin of claim 4, further comprising a controller electroconductively coupled to the motor and configured to apply a signal to the motor corresponding to a command supplied to the controller.

7. The locking pin of claim 6, wherein the controller is configured to:
   receive an unlock command transmitted wirelessly from a remote RF transceiver;
   translate the unlock command into a corresponding signal; and
   apply the corresponding signal to the motor to move the object to the unlocking position.

8. The locking pin of claim 6, wherein the controller is configured to:
   receive an identification (ID) command transmitted wirelessly from a remote RF transceiver,
   modulate the ID command with a second signal corresponding to a unique ID code associated with the locking pin so as to produce an ID signal, and
   transmit the ID signal wirelessly to the remote RF transceiver to identify the locking pin.

9. The locking pin of claim 6, wherein the controller comprises:
   a radio-frequency (RF) antenna disposed at the first end of the body;
   an RF transceiver electroconductively coupled to the antenna;
   a microcontroller electroconductively coupled to the RF transceiver and the motor; and
   a power source electroconductively coupled to the motor, the RF transceiver, and the microcontroller.

10. The locking pin of claim 9, further comprising:
    a second closure disposed at the second end of the body and an aperture defined through the second closure;
    a release rod having an outer end extending from the controller and through the aperture in the second closure;
    a biasing mechanism disposed between the object and the first closure and configured to move an assembly comprising the object, the controller, the power source and the release rod toward the second end of the body; and
    a lock disposed in or adjacent to the second closure and having a locked state and an unlocked state, the lock being configured, when disposed in the locked state, to engage the release rod and hold the assembly such that the object is disposed in the locking position, and when disposed in the unlocked state, to disengage from the release rod and allow the biasing mechanism to move the assembly such that the object is disposed in the unlocking position and the second closure is removable from the body.

11. The locking pin of claim 10, wherein the lock comprises a plurality of buttons which, when pressed in a predetermined sequence, causes the lock to transition from the locked state to the unlocked state, and wherein the biasing mechanism comprises a spring.

12. A method for accessing the assembly of claim 11, the method comprising:
    pressing the buttons in the predetermined sequence; and
    removing the second closure and the assembly from the body.

13. The locking pin of claim 10, further comprising at least one indicator configured to produce an alarm in response to an application of a signal to the alarm, and wherein the controller is configured to:
    receive a locate command transmitted wirelessly from a remote RF transceiver,
    translate the locate command into a corresponding signal, and
    apply the corresponding signal to the at least one indicator so as cause the at least one indicator to produce the alarm.

14. The locking pin of claim 13, wherein:
the at least one indicator comprises a light emitting diode (LED) disposed at the outer end of the release rod and capable of producing light of a plurality of different colors, and
the controller is configured to control the LED to produce light of a first color when the power source is at a first charge level, a second color when the power source is at a second charge level, and a third color when the RF transceiver receives a command transmitted wirelessly from a remote RF transceiver.

15. A method for controlling relative movement between adjacent first and second structures using a locking pin, the locking pin including a body, a first closure, a plurality of latch bolts, a keeper, and a mechanism, wherein the body has an inner surface, an outer surface, opposite first and second ends, a sidewall extending between the opposite first and second ends, a flange disposed on the outer surface between the first and second ends, and a plurality of apertures, where at least one aperture is defined through the sidewall, the first closure is disposed at the first end of the body, the plurality of latch bolts is disposed in the body and adjacent to the first closure, the keeper is disposed adjacent to the first end of the body, and the mechanism configured to selectably engage each latch bolt, the method comprising:
aligning a first opening extending through the first structure coaxially with a second opening extending through the second structure such that a side surface of the first structure is oriented in a direction generally opposite to that of a side surface of the second structure;
moving each latch bolt into an unlocked position using the mechanism, wherein the mechanism disengages from each latch bolt to allow the keeper to solely retain each latch bolt in the unlocked position, and wherein each latch bolt is disposed at least substantially within the inner surface of the body in the unlocked position;
inserting the first end of the body through the first and second openings such that the latch bolts are disposed outside of the side surface of the first structure and the flange is disposed outside of the side surface of the second structure; and
moving the latch bolts into locked positions using the mechanism such that the first and second structures are clamped between the latch bolts and the flange, wherein each latch bolt is disposed at least partially outside of the outer surface of the body in the locked position.

16. The method of claim 15, further comprising:
moving each latch bolt from the locked position to the unlocked position with the mechanism and biasing the latch bolt to the unlocked position by the keeper, such that the latch bolts are disposed at least substantially within the inner surface of the body; and
withdrawing the body from the openings such that the first structure is free to move relative to the second structure.

17. A method for making a locking pin, the locking pin including a body having an inner surface, an outer surface, opposite first and second ends, a sidewall extending between the opposite first and second ends, and a plurality of apertures, at least one aperture of the plurality of apertures is defined through the sidewall, the method comprising:
placing a first closure at the first end of the body;
disposing a plurality of latch bolts in the body and adjacent to the first closure, each latch bolt being moveable through a corresponding one of the apertures and between a locked position, disposed at least partially outside of the outer surface of the body, and an unlocked position, disposed at least substantially within the inner surface of the body;
inserting a keeper into the body and adjacent to the first end;
coupling the keeper to each of the latch bolts;
configuring the keeper to solely retain each latch bolt in the unlocked position and to bias each latch bolt for movement from the locked position to the unlocked position;
installing a mechanism into the body and adjacent to the latch bolts; and
configuring the mechanism to selectably engage each latch bolt and move the latch bolt to the locked position, and to disengage from the latch bolt and allow the keeper to move the latch bolt to the unlocked position.

18. The method of claim 17, wherein the installing comprises:
inserting an actuator having an output end into the body;
coupling the output end of the actuator to an object;
inserting a motor into the body;
coupling the motor to the actuator;
configuring the motor to move the output end of the actuator to a selected position in the body in response to application of a corresponding signal to the motor;
installing a controller in the body;
electroconductively coupling the controller to the motor; and
configuring the controller to apply a signal to the motor corresponding to a command supplied to the controller.

19. The method of claim 18, wherein the installing comprises:
disposing a radio-frequency (RF) antenna at the first end of the body;
electroconductively coupling an RF transceiver to the antenna;
electroconductively coupling a microcontroller to the RF transceiver and the motor; and
electroconductively coupling a power source to the motor, the RF transceiver, and the microcontroller.

20. The method of claim 19, further comprising:
placing a second closure at the second end of the body, the second closure having an aperture defined therethrough;
extending a release rod having an outer end from the controller and through the aperture in the second closure;
inserting a biasing mechanism between the object and the first closure;
configuring the biasing mechanism to move an assembly comprising the object, the controller, the power source and the release rod toward the second end of the body;
disposing a lock in or adjacent to the second closure, the lock having a locked state and an unlocked state; and
configuring the lock, when disposed in the locked state, to engage the release rod and hold the assembly such that the object is disposed in the locking position, and, when disposed in the unlocked state, to disengage from the release rod and allow the biasing mechanism to move the assembly such that the object is disposed in the unlocking position and the second closure is removable from the body.

* * * * *